United States Patent [19]

Murray

[11] Patent Number: 4,579,923

[45] Date of Patent: Apr. 1, 1986

[54] STERIC STABILIZATION OF PVC PARTICLES AGAINST AGGLOMERATION

[75] Inventor: Eric J. Murray, Camberley, England

[73] Assignee: BP Chemicals Limited, London, England

[21] Appl. No.: 569,395

[22] Filed: Jan. 9, 1984

[30] Foreign Application Priority Data

Jan. 13, 1983 [GB] United Kingdom ................. 8300889

[51] Int. Cl.[4] .................... C08F 220/20; C08F 114/06
[52] U.S. Cl. ..................................... 526/209; 526/202; 526/210; 526/227; 526/320; 526/344.1
[58] Field of Search ....................... 526/209, 320, 344.1

[56] References Cited

U.S. PATENT DOCUMENTS 3,004,958 10/1961 Berens ................................. 526/320
3,017,396 1/1962 Arond ................................. 526/320
3,583,955 6/1971 Holicky .............................. 526/320

FOREIGN PATENT DOCUMENTS 2306808 8/1974 Fed. Rep. of Germany ...... 526/320
14819 7/1964 Japan .................................. 526/320

Primary Examiner—Christopher A. Henderson
Attorney, Agent, or Firm—Brooks Haidt Haffner & Delahunty

[57] ABSTRACT

The present invention relates to a method of steric stabilization of polyvinyl chloride (PVC) particles against agglomeration by use of additives during polymerization of vinyl chloride. The method is characterized by the use of a hydroxy alkylacrylate comonomer added to the reactants prior to the onset of polymerization. The process of the present invention can be carried out to produce PVC either by bulk or by suspension polymerization techniques.

The comonomer used may be considered as an adduct of hydroxypropyl(meth)acrylate and propylene oxide. The PVC products so produced have a better monomer desorption rate and can absorb more plasticizer than those produced in the absence of the comonomer.

10 Claims, 1 Drawing Figure

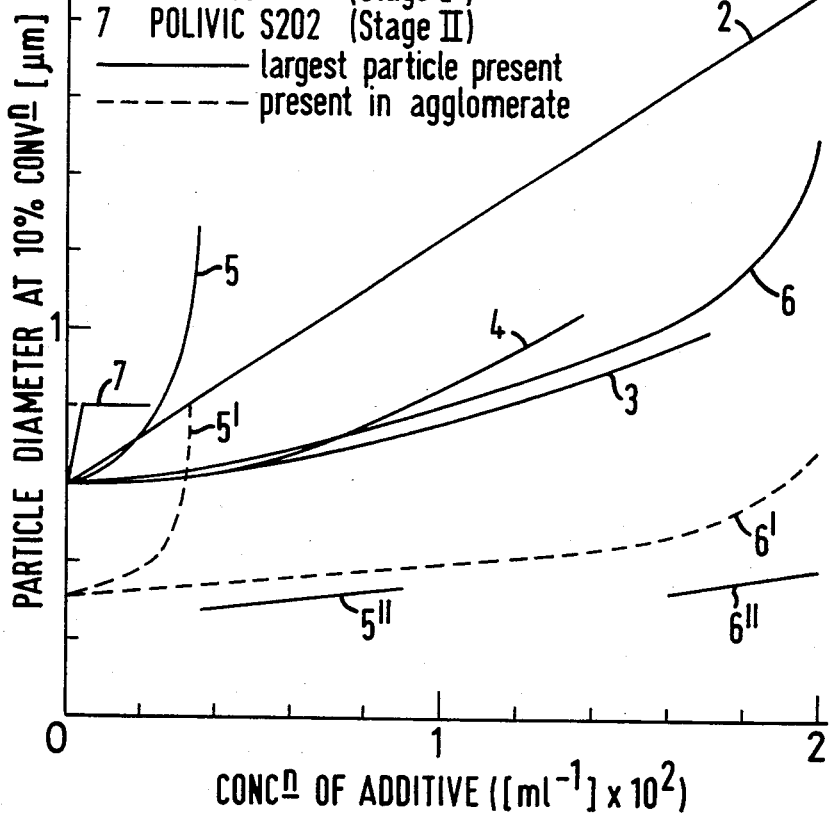

STERIC STABILIZATION OF PVC PARTICLES AGAINST AGGLOMERATION

The present invention relates to a method of steric stabilisation of polyvinyl chloride (PVC) particles against agglomeration by use of additives during polymerisation of vinyl chloride.

Most PVC is produced via the suspension route. In this process the vinyl chloride monomer (VCM) is suspended as liquids droplets in a continuous water phase by a combination of vigorous agitation and the presence of a protective colloid (dispersant or suspending agent). The choice of the dispersant is important as it contributes to the control of particle size distribution of the PVC produced and has a major effect on the particle structure eg its porosity. A monomer soluble free radical initiator eg an azo or peroxide type material soluble in VCM is used such that the polymerisation takes place within the suspended droplets, similarly to bulk polymerisation.

When the desired conversion has been reached, usually 75–95%, the reaction can be chemically short stopped if required and the bulk of the remaining monomer recovered. The product slurry is then stripped down to very low residual vinyl chloride levels by treatment at elevated temperatures, either in the reactor or a similar vessel, or by contact with steam in a countercurrent multiplate stripping tower. The slurry is then dewatered by centrifuging and the resulting wet cake dried, commonly on a multistage flash drier, although a wide variety of different drier types is used by various manufacturers. After drying the product is passed through a scalping screen to remove extraneous large particles before bagging or loading to bulk road tankers.

Kinetically the mass and suspension vinyl chloride polymerisations are identical.

The suspension and mass polymerisation processes both give a particulate, free flowing product having the same general appearance with a mean particle size usually in the range 100–150 microns.

Suspension and mass polymers are usually porous in nature and, although there are detailed differences in their surface appearance, it is easy to see by either cutting open or thin sectioning a single particle that they are both made up of a large number of much smaller particles. Using the terminology proposed by Faulkner, P. G. in J. Macromol. Sci-Phys., B11(2), (1975) pp 251–279, as will be done throughout this specification, the particles initially formed in the polymerisation process are termed the Stage I particles which agglomerate into small intermediate entities of approximately 1 micron in diameter and will be called Stage II particles. By the agglomeration of Stage II particles the final complete grains of the resin are formed which are referred to as Stage III particles. Briefly, the Stage III particles appear, when viewed by scanning electron microscope (SEM), to consist of Stage II particles partially fused together to form a three dimensional lattice thus giving the Stage III particle strength and rigidity.

The structure and morphology of the particles, most importantly the Stage II particles, are widely recognised to have an important bearing upon the properties of the finished products, especially on their processability and on the rate of removal of residual vinyl chloride monomer (the so called monomer desorption). For instance, a PVC resin with improved uniformity in grain size and porosity with smaller Stage II particles and with a faster rate of monomer desorption than for normal resins should produce a more-uniform product. The more porous the product and the fewer the number of gels formed per unit area of the product the better will be its absorption of a plasticiser. This will also result in a good, free-flowing product with adequate extrusion properties.

Production of PVC resin with these optimum characteristics of porosity, plasticizer adsorption and monomer desorption has hitherto been difficult. This is mainly due to the difficulty of controlling the structure and morphology of the Stage II particles (agglomerates) in such a manner that the particles are small and uniform in size and are substantially spherical in shape. Numerous expedients have been suggested including the use of dispersants during the polymerisation process.

The conventional dispersant systems hitherto used are the so-called primary dispersants and consist of one or more water soluble organic compounds such as those based on polyvinyl alcohols and substituted cellulose. However, the degree of surface activity of these primary dispersants is limited and additional secondary dispersants have been used further to increase porosity.

The commonly used secondary dispersants include sodium lauryl sulphate (U.S. Pat. No. 3,042,665), sodium dioctyl sulphosuccinate (U.S. Pat. No. 2,985,638) and sorbitan esters (U.S. Pat. No. 4,000,355). More recently the use of low molecular weight polyvinyl acetates of very low degrees of hydrolysis has been suggested. Addition of (meth)acrylic acid and the mono- and di-esters thereof with dihydric alcohols has also been proposed (U.S. Pat. No. 4,104,457) to increase the final particle size of the product.

It has now been found that the polymerisation of vinyl chloride monomer to the ultimate resins made up of Stage III particles proceeds through a set of intermediate stages between the recognised Stages I and II. These intermediate stages will hereafter be identified as Stages I' and I" for convenience. It is believed that these intermediate Stages I' and I" represent the early stages of agglomeration of Stage I particles to the Stage II particles. It has been found that these intermediate stages can be sterically stabilised to give more effective control over the shape, size and structure of the Stage II particles thereby preventing them from agglomerating into random shapes and sizes which adversely affect the characteristics desired in the PVC resin, by selecting a particular group of additives which are used as comonomers during the polymerisation process.

Accordingly, the present invention is a method of producing polyvinyl chloride by polymerising vinyl chloride monomer in the presence of a polymerisation initiator characterised in that a comonomer of the general formula:

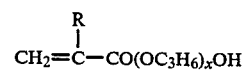

wherein R is H or methyl and x has a value between 2 and 20 is added to the reactants prior to the onset of polymerisation.

The process of the present invention can be carried out to produce PVC either by bulk or by suspension polymerisation techniques.

The initiator used may be any of the conventional vinyl chloride monomer polymerisation catalysts well known to those skilled in the art. A peroxide initiator such as lauroyl peroxide is most preferred.

The comonomer used in the present invention may be considered as an adduct of hydroxypropyl(meth)acrylate and propylene oxide. Methods of producing such adducts are well known in the art. For instance, they may be produced by reacting a hydroxypropyl(meth)acrylate with the desired molar ratio of propylene oxide, depending upon the number of propylene oxide appendages required in the comonomer, in the presence of a catalyst such as boron trifluoride. By this method it is possible to regulate the number of —(OC$_3$H$_6$) units in the comonomer as desired. For example comonomers have been produced which will be identified hereafter as HPMA 3P, HPMA 6.7 P, HPMA 9P and HPMA 15P and in which HPMA represents hydroxypropyl methacrylate and the terminal P represents propylene oxide units.

The comonomer is suitably introduced into the polymerisation reactor prior to the addition of the vinyl chloride monomer. The concentration of the comonomer in the reaction mixture is suitably between 0.01 and 5% by weight preferably between 0.05 and 1% by weight. The concentration of comonomer required for suspension polymerisation is higher than that needed for bulk polymerisation. The polymerisation is suitably carried out in bulk by introducing the initiator dissolved in a solvent such as 2-chloro-propane into the polymerisation reactor followed by the comonomer and finally the vinyl chloride monomer. The reaction temperature used is suitably between 40° and 75° C., preferably between 50° and 65° C. The reaction is suitably carried out under superatmospheric pressure.

By using the comonomers of the present invention, it might be expected kinetically that significantly larger and more aspherical Stage II particles would result due to the kinetic changes in the system. However, surprisingly, it was found that the products produced by the process of the invention have highly spherical Stage II particles, particularly when using HPMA 3P and HPMA 6.7P as comonomers. However, the degree of sphericity decreases with increasing chain length of the propylene oxide units in the comonomers.

The comonomers of the present invention are believed to achieve steric stabilisation of the PVC particles by acting as surfactants which are adsorbed at the PVC/vinyl chloride monomer interface in such a way that the polyoxypropylene tail of the adduct protrudes into the vinyl chloride monomer phase. Moreover, in the case of these comonomers it is believed that these molecules are also chemically bound through the unsaturated linkage to the PVC particle surface and are therefore more strongly attached than the conventional surfactants of the prior art (eg 50% hydrolysed polyvinyl acetate in methanol or sorbitol monostearate respectively sold commercially as Polivic S202 and Span 60) which are physically adsorbed onto the surface.

The process of the present invention is further illustrated with reference to the following Examples:

EXAMPLES

A. Reagents

The source of the reagents used in the following Examples and Tests was as follows:

| | |
|---|---|
| | ex BPCL |
| Lauroyl peroxide | ex Luperox |
| 2-Chloropropane | ex Aldrich |
| Methanol | Analar Grade |
| HPMA 3P | ex BPCL |
| HPMA 6.7P | ex BPCL |
| HPMA 9P | ex BPCL |
| HPMA 15P | ex BPCL |

Vinyl chloride was purified by vacuum distillation followed by degassing by repeated freezing and thawing cycles, the system being pumped down to a residual vacuum during each cycle, and left in darkened storage.

Table 1 contains a typical set of results of a gas chromatography analysis on the series of comonomers HPMA 3P to HPMA 15P. From these results it can be seen that these compounds possess a distribution of polyoxypropylene adducts of various lengths the numerical part of their nomenclature corresponding to the ratio of the theoretical number of propylene oxide units contained within the appendage to each HPMA unit. Each of these compounds was found to contain between 3 to 12% polyglycols as impurities. HPMAnP derivatives with n=1 are 13% water soluble becoming increasingly insoluble as n increases.

B. Polymerisation

All polymerisations were carried out in quiescent dilatometric scale at 50° C. with lauroyl peroxide as initiator, as detailed below. The preweighed dilatometer, which had a total volume of approximately 2 cm$^3$ and capillary diameter of 1.6 mm, was initially charged with the required amount of initiator dissolved in 2-chloropropane using a microsyringe equipped with a long hypodermic needle. The solvent was removed under vacuum and the dilatometer plus initiator reweighed. The additives when used will also added using a microsyringe and the dilatometer reweighed. Vinyl chloride was then distilled into the dilatometer under high vacuum and the reactants degassed by repeated freezing and thawing cycles, the system being pumped down to a residual vacuum during each cycle. The system was sealed by collapsing the top of the capillary tube and then the dilatometer and reactants were reweighed, enabling an accurate measurement of the concentration of each reactant to be made. The charged dilatometer was immersed in a temperature controlled water bath and the progress of the reaction followed via the volume contraction, which occurs during polymerisation, by use of a cathetometer. At the desired conversion the dilatometer was removed from the bath, cooled firstly under running water, then placed in liquid nitrogen.

C. Isolation of PVC from the reaction system

In order to preserve the insitu morphology of the PVC particles formed during the polymerisation an adaption of the method devised by Behrens [Plaste U. Kautschuk, 25, 563 (1978)] was used to separate the PVC particles from the reaction mixture. The dilatometer, its contents frozen at −196° C., was opened and immediately submerged in 35 cm$^3$ of chilled methanol (−78° C.). The system was permitted to slowly equilibrate to ambient temperature, the PVC particles becoming suspended in the methanol. On standing these particles settled to the bottom of the flask enabling excess methanol to be decanted off. The particles were washed twice with fresh methanol prior to being studied by microscopy.

D. Investigation of particle size and morphology

Particle size and morphology were studied by transmission electron microscopy (TEM) and scanning electron microscopy (SEM). The mean particle diameter (d) was measured from the TEM micrographs, due to the greater magnification attainable via TEM, while the SEM micrographs gave a clear indication of particle morphology. It is found that the true volume of the particle (as measured by SEM) was equal to approximately double the one measured by TEM ie $V(SEM) = 2V(TEM)$ or $d(SEM) = B\ 2^{(0.33)}d\ (TEM)$. Thus in this specification where a comparison has been made between the mean particle diameter d of particles formed in the absence of additives with those formed in the presence of various concentrations of additives it is valid to use results obtained directly from a TEM micrograph. To obtain true values of d it is necessary to multiply the recorded ones by $2^{(0.33)}$.

To facilitate comparison with control experiments the changes in particle size on addition of the hydroxyalkyl acrylates are plotted in the accompanying Figure, as particle diameter at 10% conversion as a function of the additive concentration.

EXAMPLES 1-4

Derivatives of Hydroxypropylmethacrylate

The effect of the addition of a series of derivatives of hydroxypropylmethacrylate containing varying lengths of polyoxypropylene adduct, HPMA 3P, HPMA 6.7P, HPMA 9P and HPMA 15P at various concentrations (0 to 1 phm) was investigated. The morphological details of this series are recorded in Table 2.

CONTROLS (Comparative Test 5)

This series of polymerisations contained no additives. Since the rate of initiation, Vi, is known to be the major factor controlling particle size and shape in quiescent bulk polymerisations, a value of Vi ($300 \times 10^{-9}$ ml$^{-1}$s$^{-1}$) at which the particle size is insensitive to changes in Vi was chosen for study. The morphological details of this series of tests are recorded in Table 3.

TABLE I

Results of Gas Chromatography Analysis of hydroxypropylmethacrylate derivatives

1. Hydroxypropylmethacrylate-propylene oxide adducts:

$$CH_2=C(CH_3)-C(O)-O(C_3H_6O)_nH$$

| n | HPMA 3P | HPMA 6.7P | HPMA 9P | HPMA 15P |
|---|---------|-----------|---------|----------|
| 2 | 12.5 | 3.3 | 2.7 | 0.8 |
| 3 | 15.5 | 4.3 | 3.5 | 1.3 |
| 4 | 16.6 | 6.3 | 4.8 | 1.7 |
| 5 | 15.8 | 9.7 | 7.1 | 5.1 |
| 6 | 12.4 | 11.0 | 8.8 | 4.7 |
| 7 | 9.5 | 14.7 | 10.9 | 6.5 |
| 8 | 6.4 | 13.0 | 13.2 | 9.5 |
| 9 | 4.0 | 11.8 | 13.5 | 12.9 |
| 10 | 2.2 | 9.2 | 12.1 | 14.2 |
| 11 | 1.2 | 6.1 | 9.3 | 12.6 |
| 12 | 0.7 | 3.2 | 5.8 | 9.5 |
| 13 | 0.2 | 1.5 | 3.0 | 6.1 |
| 14 | Not detected | 0.7 | 1.3 | 2.9 |

2. Glycols: $HO(C_3H_6O)_xH$

| x | HPMA 3P | HPMA 6.7P | HPMA 9P | HPMA 15P |
|---|---------|-----------|---------|----------|
| 1 | 0.5 | 0.8 | 0.4 | 1.6 |
| 2 | 0.6 | 1.2 | 0.6 | 1.4 |
| 3 | 1.1 | 1.6 | 1.2 | 1.5 |
| 4 | 0.3 | 0.6 | 0.6 | 1.7 |
| 5 | 0.2 | 0.6 | 0.7 | 2.8 |
| 6 | 0.2 | 0.3 | 0.3 | 1.8 |
| 7 | 0.1 | 0.1 | 0.1 | 0.9 |
| 8 | Not detected | Not detected | 0.1 | 0.5 |

TABLE 2

Morphological results from polymerisations containing derivatives hydroxypropylmethacrylate, (Vi = $300 \times 10^{-9}$ ml$^{-1}$s$^{-1}$), Temp. Poly$^n$ = 50° C.

| Example No | Conc$^n$ (phm) | d(Stage I') (microns) | d(Stage I'') (microns) | d(Stage II) (microns) |
|---|---|---|---|---|
| 1. HPMA 3P | | | | |
| (a) | 0.25 | — | — | 0.622 |
| (b) | 0.48 | 0.321 | 0.715 | 1.503 |
| (c) | 0.93 | 0.664 | 1.118 | 2.280 |
| 2. HPMA 6.7P | | | | |
| (a) | 0.24 | — | — | 0.660 |
| (b) | 0.31 | — | 0.286 | 0.622 |
| (c) | 0.39 | — | 0.344 | 0.683 |
| (d) | 0.48 | — | — | 0.982 |
| (e) | 0.97 | — | — | 0.990 |
| 3. HPMA 9P | | | | |
| (a) | 0.26 | — | 0.322 | 0.650 |
| (b) | 0.27 | — | 0.298 | 0.589 |
| (c) | 0.45 | — | 0.320 | 0.641 |
| (d) | 0.50 | — | — | 0.787 |
| (e) | 0.96 | — | 0.494 | 1.099 |
| 4. HPMA 15P | | | | |
| (a) | 0.25 | — | 0.377 | 0.706 |
| (b) | 0.49 | 0.345 | — | — |
| (c) | 0.97 | 0.220 | — | — |

NB. Particle size measurements obtained from TEM micrographs.
d = mean particle diameter.

TABLE 3

Morphological results from polymerisations containing no additives (controls) Vi = $300 \times 10^{-9}$ ml$^{-1}$s$^{-1}$
Polymerisation Temperature = 50° C.

| Comparative Tests | d(Stage I') (microns) | d(Stage I'') (microns) | d(Stage II) (microns) |
|---|---|---|---|
| (a) | — | 0.281 | 0.593 |
| (b) | — | 0.384 | 0.580 |
| (c) | — | — | 0.620 |
| (d) | — | 0.312 | 0.607 |
| (e) | — | — | 0.554 |
| (f) | — | 0.315 | 0.612 |
| (g) | — | — | 0.577 |
| (h) | — | — | 0.570 |
| Mean | — | 0.323 ± 0.08 | 0.589 ± 0.04 |

NB. - Particle size measurements taken from TEM micrographs.
d = particle diameter.

COMPARATIVE TESTS 6 AND 7

| Reagents | |
|---|---|
| Sorbitan Monostearate | Span 60 (Regd. Trade Mark) ex Atlas Chemicals |
| Random copolymer (50% hydrolysed polyvinyl acetate alcohol (Mn = 5000) | Polivic S202 (Regd. Trade Mark) (ex Sigma Chemicals) |
| Diethyl ether | ex May & Baker |

Vinyl chloride was purified by vacuum distillation followed by degassing by repeated freezing and thawing cycles, the system being pumped down to a residual vacuum during each cycle, and left in darkened storage reservoirs connected to a vacuum line ready for future use. Span 60 was dissolved in diethyl ether (2.6 g/100 cm$^3$). Polivic S202 as supplied contained 25% solids, 61% methanol and 14% methyl-acetate by weight. This was further diluted with methanol to 10% solids, 84.4% methanol and 5.6% methylacetate.

Experimental procedures of polymerisation, isolation of PVC from the reaction system and investigation of particle size and morphology was as previously stated in paragraphs B, C and D above except for the following: Span 60 dissolved in diethylether was injected into the dilatometer, after charging with initiator, and the solvent removed under high vacuum prior to the dilatometer being reweighed and then charged with vinyl chloride. Polivic S202 was charged to the dilatometer as a 10% solution (prepared as above) and then either the solvent removed as for Span 60 or retained and the vinyl chloride charged.

The changes in particle size on addition of Span 60 are recorded in Table 4, (obtained from TEM micrographs), and plotted in the accompanying Figure, as particle diameter at 10% conversion as a function of the additive concentration.

TABLE 4

Morphological Results from Polymerisation containing Span 60 as an Additive - (Vi = 300 × 10$^{-9}$ ml$^{-1}$s$^{-1}$) Polymerisation Temperature = 50° C.

| Conc$^n$ of Span 60 (phm) | at 10% conversion | | |
|---|---|---|---|
| | d(Stage I') (microns) | d(Stage I'') (microns) | d(Stage II) (microns) |
| 0.18 | — | 0.352 | 0.697 |
| 0.30 | — | 0.350 | 0.787 |
| 0.38 | 0.246 | 0.421 | 0.837 |
| 0.44 | — | 0.410 | 0.855 |
| 0.84 | — | 0.453 | 1.107 |
| 0.84 | 0.327 | 0.742 | 1.372 |
| 1.12 | 0.481 | 1.113* | 2.284* |
| 1.21 | 0.406 | 1.220* | 2.617* |
| 5.89 | 0.326 | — | — |

NB Particle size measurements taken from TEM micrographs
d = particle diameter.
*Few particles of this type present in sample.

TABLE 5

Morphological Results from Polymerisations containing Polivic S202 as an Additive
(Vi = 300 × 19$^{-9}$ ml$^{-1}$s$^{-1}$, Polym$^n$ Temp. 50° C.)

| Active Conc$^n$ of Polivic S202 (phm) | Conc$^n$ of MeOH (phm) | Conc$^n$ of MeAC (phm) | at 10% conversion | |
|---|---|---|---|---|
| | | | d(Stage I'') (microns) | d(Stage II) (microns) |
| 0.22 | 0 | 0 | 0.363 | 0.566 |
| 0.74 | 0 | 0 | 0.282 | 0.547 |
| 1.26 | 0 | 0 | 0.205 | 0.542 |
| 0.04 | 0.34 | 0.02 | 0.313 | 0.631 |
| 0.13 | 1.10 | 0.07 | 0.378 | 0.810 |
| 0.15 | 2.11 | 0.14 | 0.457 | 0.900 |
| 0.47 | 3.97 | 0.26 | 0.453 | 0.930 |
| 0.58 | 4.90 | 0.32 | 0.448 | 0.847 |
| 0.74 | 6.25 | 0.41 | 0.398 | 0.875 |
| 0.94 | 7.93 | 0.53 | 0.427 | 0.940 |

NB Particle size measurements taken from TEM micrographs
MeOH - Methanol
MeAC - Methyl Acetate
d - particle diameter Both particle diameters d(Stage II)$_{10\%}$ and d(Stage I'')$_{10\%}$ increased linearly with additive concentration up to a loading of approximately 0.7 phm above which the particle diameter, d, increased exponentially. From 0 to 0.7 phm of Span 60 the Stage II particles became increasingly aspherical while still constituting 100% of the unflocculated particles. Above 0.7 phm of Span 60 the percentage of Stage II and Stage I'' particles present in the sample fell dramatically the greatest proportion of unflocculated particles being present as Stage I'. At 5.89 phm of Span 60 no Stage II and Stage I'' particles were present only Stage I' particles. Stage I' particles increased in size linearly from 0 to 1.2 phm of Span 60. The particle sizes of the polymer from polymerisations containing Polivic S202 are recorded in Table 5 and are also plotted as a function of additive concentration in the accompanying Figure.

When added as a solid, Polivic S202 remained undissolved at the base of the dilatometer and had no effect on particle morphology or size. However when added in the dissolved state a gradual increase in d(Stage II)$_{10\%}$ and d(Stage I'')$_{10\%}$ which formed a plateau at a loading of 0.25 phm active ingredient [d(Stage II)$_{10\%}$ increased by ca 55%] was observed. The increase in particle size was accompanied by a change to more aspherical Stage II particles. Further, a small percentage of large (d$_{10\%}$ = 1.952 microns) highly aspherical particles were also observed.

COMPARISON OF THE VARIOUS COMONOMERS STUDIED

HPMA 3P and HPMA 6.7P altered the physical properties of the PVC produced, most probably by lowering the crystallinity, such that highly spherical Stage II particles were formed. The accompanying figure graphically plots the effect on polymer particle diameter (at ten percent conversion) as a function of concentration of different additives.

From the Figure, where the effect of these compounds on particle size is compared on a molar basis, it can be seen that as the length of the polyoxypropylene chain attached to the methacrylic acid unit increases, the steric stabilising power of the comonomer also increases. For HPMA 3P the presence of the oxypropylene units further enhances the increase in d(Stage II) size due to kinetic factors. For the remaining comonomers the longer the polyoxypropylene appendage the greater was the observed stabilisation against agglomeration and the larger the d(Stage II) values. The anomalous effect of HPMA 3P shown in the Figure can be assigned to the effect of this additive on the kinetics of the reaction whereby it appears to retard the rate of initiation. A consequence of the steric stabilisation mechanism, against particle agglomeration, proposed above is that the polyoxypropylene units are present in the vinyl chloride and it is these that supply the steric stability. This combined with the shape of d(Stage II) versus concentration of additive curves for HPMA 6.7P, HPMA 9P and HPMA 15P implies that these comonomers are acting as Type 1 secondary surfactants (ie one which adsorbs onto the PVC/VCM interface to form long tails which protrude into the VCM phase) rather than a Type 2 secondary surfactant (ie one which adsorbs at the PVC/VCM interface to form many trains and loops with only a few short tails). The similarities between the shape of the particle size versus concentration of additive curves for HPMA 6.7P, HPMA 9P and HPMA 15P to that of Span 60 (a Type 1 secondary surfactant) rather than that of Polivic S202 (a Type 2 secondary surfactant) is evident from the Figure.

Addition of Span 60 results in an increase in particle size and at sufficiently high concentration the termination of particle agglomeration at the Stage I' stage. Further the PVC particles formed became less spherical on increasing additive concentration.

Addition of Polivic S202 results in an increase in Stage II and Stage I" particle size which formed a plateau at a Polivic S202 loading of 0.25 phm. Further the PVC particle formed became less spherical as their size increased.

In suspension polymerisations, a plot of product porosity versus concentration of the additive shows a similarity in shape, especially for Span 60 and Polvic S202, to that shown in the accompanying Figure. It is therefore reasonable to conclude that there is a relationship between particle diameter, measured from such experiments as are described within this specification, and product porosity. On this basis the Figure shows that the additives of the present invention are superior to the conventional Type 1 and Type 2 secondary surfactants in their overall performance.

For instance, the HPMA additives are as good as if not better than Span 60 with respect to the concentration of additive used to achieve a given particle diameter. This effect will be even more dramatic if compared on a weight basis because HPMA additives have a relatively higher molecular weight.

On the other hand, it is better than a high molecular weight Type 2 surfactant of the Polvic S202 type because at comparable concentrations HPMA additives can produce particles of relatively higher diameter thus giving greater control and flexibility over the PVC resin produced.

I claim:

1. A process of producing polyvinyl chloride by polymerising vinyl chloride monomer in the presence of a polymerisation initiator characterised in that a comonomer of the general formula:

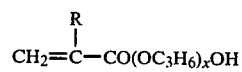

wherein R is H or methyl and x has a value between 2 and 20 is added to the reactants prior to the onset of polymerisation and wherein the concentration of the comonomer in the reaction mixture is from 0.05 to 1% by weight.

2. A process according to claim 1 wherein the comonomer is an adduct of hydroxypropyl acrylate and propylene oxide.

3. A process according to claim 2 wherein the comonomer is selected from HPA 3P, HPA 6.7 P, HPA 9P and HPA 15P in which HPA represents a hydroxypropyl acrylate unit and the terminal P represents propylene oxide units.

4. A process according to claim 1 wherein the comonomer is an adduct of hydroxypropyl(meth) acrylate and propylene oxide.

5. A process according to claim 4 wherein the comonomer is selected from HPMA 3P, HPMA 6.7 P, HPMA 9P and HPMA 15P in which HPMA represents a hydroxypropyl methacrylate unit and the terminal P represents propylene oxide units.

6. A process according to claim 1 wherein the comonomer is an adduct of hydroxypropyl acrylate and propylene oxide.

7. A process according to claim 6 wherein the comonomer is selected from HPA 3P, HPA 6.7 P, HPA 9P and HPA 15P in which HPA represents a hydroxypropyl acrylate unit and the terminal P represents propylene oxide units.

8. A process according to claim 1 wherein the polymerisation is carried out in bulk by introducing the initiator dissolved in a solvent into the polymerisation reactor followed by the comonomer and finally the vinyl chloride monomer.

9. A process according to claim 1 wherein the polymerisation reaction is carried out at a temperature from 40° to 75° C.

10. A process according to claim 1 wherein the polymerisation reaction is carried out under superatmospheric pressure.

* * * * *